(No Model.)

H. S. MERTZ.
THILL COUPLING.

No. 249,381. Patented Nov. 8, 1881.

Witnesses
D. S. Williams
Harry Smith

Inventor
Henry S. Mertz
by his Attorneys

UNITED STATES PATENT OFFICE.

HENRY S. MERTZ, OF ALLENTOWN, PENNSYLVANIA, ASSIGNOR OF ONE HALF TO REVERE A. GERNERT, OF SAME PLACE.

THILL-COUPLING.

SPECIFICATION forming part of Letters Patent No. 249,381, dated November 8, 1881.

Application filed September 8, 1881. (No model.)

*To all whom it may concern:*

Be it known that I, HENRY S. MERTZ, a citizen of the United States, residing in Allentown, Lehigh county, Pennsylvania, have invented certain Improvements in Thill-Couplings for Vehicles, of which the following is a specification.

The object of my invention is to so construct a shaft or pole coupling for vehicles that it will be perfectly noiseless and secure, and will not become loosened by wear, and this object I attain in the manner which I will now proceed to describe, reference being had to the accompanying drawings, in which—

Figure 1:
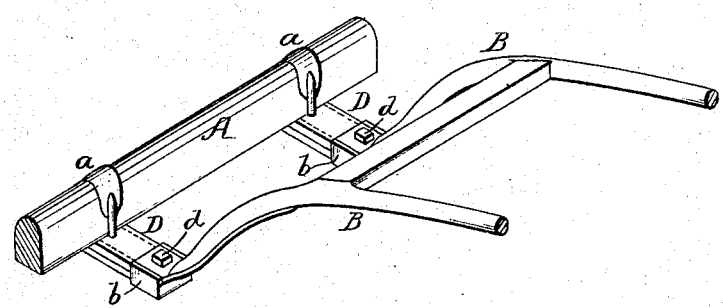
Figure 3:
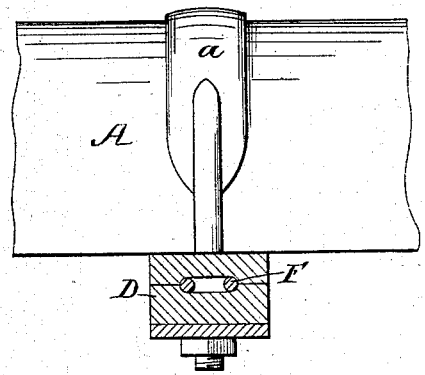
Figure 2:
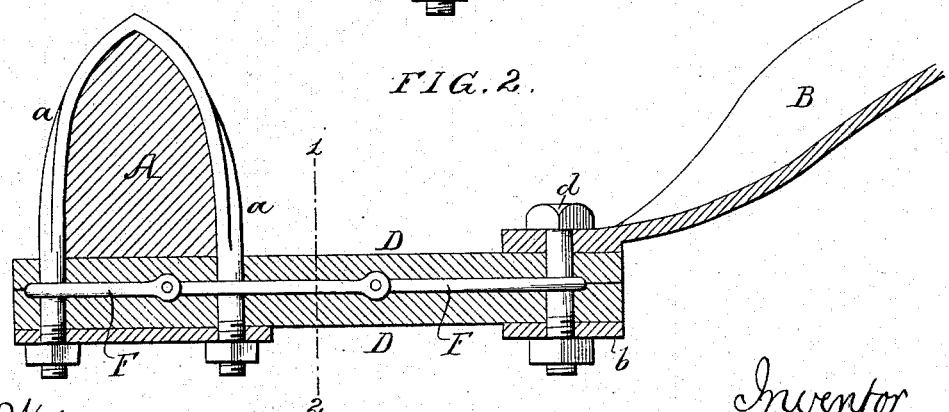

Figure 1 is a perspective view of part of the axle and shafts of a vehicle provided with my improved coupling; Fig. 2, a longitudinal section of one of the couplings on a larger scale than Fig. 1; and Fig. 3, a transverse section on the line 1 2, Fig. 2.

A represents part of the axle of the vehicle, and B the shafts of the same, each shaft being connected to the axle by a coupling-strip, D, which is secured to the axle at the rear end by means of the usual clip, $a$, the front end of the strip being secured to the shaft B by means of a plate, $b$, and bolt $d$. Each coupling-strip consists of leather, india-rubber, heavy cloth, or other equivalent fibrous or textile material possessing the necessary strength and flexibility; and each strip may be composed of any desired number of layers properly secured together, the coupling-strips shown in the drawings each comprising two layers secured together near the edges by sewing. A coupling-strip thus constructed, while permitting free movement of the shafts, is perfectly noiseless when in use, and does not become loosened by wear, thus overcoming the main objections to the usual metallic thill-couplings, further advantages of my improved coupling being its cheapness, its freedom from deterioration by rust, and the facility with which its strength may be regulated by simply increasing or diminishing the size of the coupling-strips D. The strips D are made of such size and strength as to resist any strains to which they are likely to be subjected; but in order to provide an additional safeguard against accident I prefer to combine with each strip a chain, F, preferably confined between the layers of which the strip is composed, the legs of the clip $a$ and the stem of the bolt $d$ passing through the links of the chain, as shown in Fig. 2, so that in the event of the breaking of the leather or other material of which the strip is composed the chain will prevent the detaching of the shafts from the axle.

I have described my invention in connection with the shafts of a vehicle; but it will be evident that it may be applied to pole-couplings as well.

I claim as my invention—

1. The combination of the axle and the pole or shafts of a vehicle with flexible coupling-strips D, each composed of leather or equivalent fibrous or textile material, as set forth.

2. The combination of the axle and the pole or shafts of the vehicle with the flexible coupling-strips D, of leather or equivalent fibrous or textile material, as described, the clips $a$, the plates $b$, and the bolts $d$, as set forth.

3. The combination of the axle and the pole or shafts, the flexible coupling-strips D, of leather or equivalent fibrous or textile material, as described, and the safety-chain F, as set forth.

In testimony whereof I have signed my name to this specification in the presence of two subscribing witnesses.

HENRY S. MERTZ.

Witnesses:
WALTER L. JONES,
C. L. KNAUSS.